May 27, 1958      W. F. SERR      2,836,300
COMBINED STRAINER AND DRIP CATCHER
Filed June 3, 1954
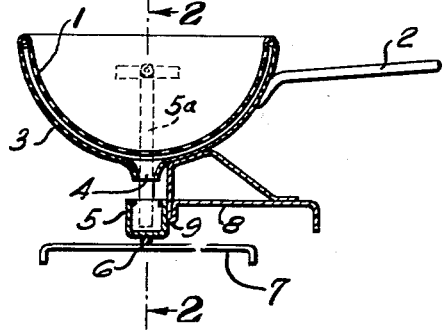
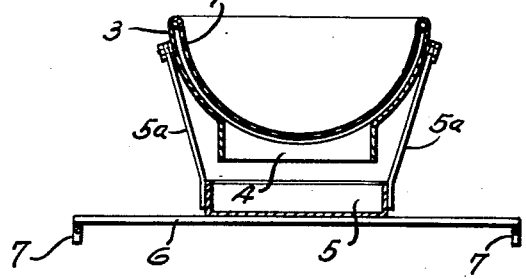
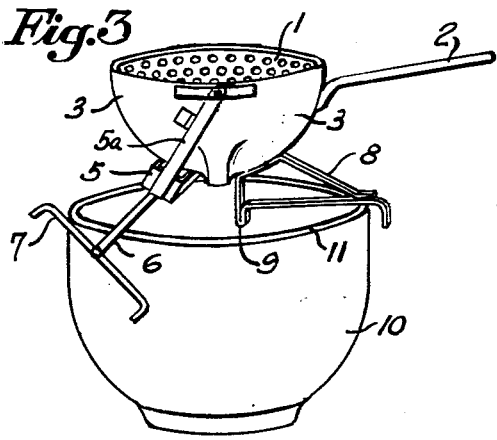
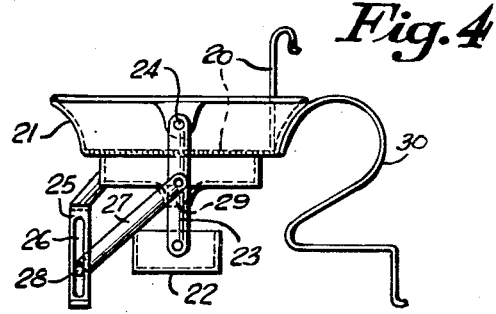
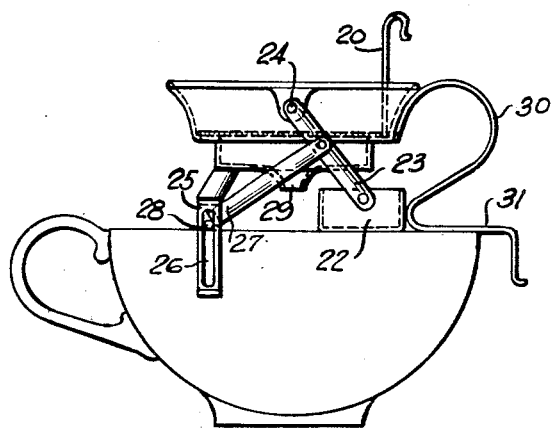
INVENTOR.
WILHELM F. SERR
BY
Richards & Geier
ATTORNEYS

United States Patent Office 2,836,300
Patented May 27, 1958

2,836,300

COMBINED STRAINER AND DRIP CATCHER

Wilhelm F. Serr, Neustadt, Germany

Application June 3, 1954, Serial No. 434,196

Claims priority, application Germany June 6, 1953

7 Claims. (Cl. 210—248)

This invention relates to a strainer for tea, coffee, milk and other liquids and refers more particularly to a strainer which is combined with a drip catcher so as to prevent the dripping of drops of liquid upon the table on which the strainer is located.

An object of the present invention is the provision of a combined strainer and drip catcher for tea, coffee, milk and other comestible liquids which is so constructed that the dripping of drops of liquid past the drip catcher is effectively avoided.

Other objects of the present invention will become apparent in the course of the following specification.

The objects of the present invention may be realized by means which prevent the raising of the strainer from the tea cup or other container before the drip catcher is located securely under the strainer.

In accordance with the present invention this is attained by mounting the strainer upon a support or combining the strainer with a support in such manner that when the strainer is placed upon a tea cup or the like, a drip catcher swingably mounted under the strainer will move to the side through a downwardly directed pressure and particularly through the weight of the strainer and/or of the support or parts thereof, and whereby the strainer moves or drops automatically and promptly due to its gravity into its operative position under the strainer as soon as the strainer is raised from the tea cup.

While the swinging movement or drop of the drip catcher into its operative position upon the raising of the strainer constitutes a general idea of the present invention, the swinging of the drip catcher into an inoperative position out of line with the strainer when the strainer or the support carrying the same is placed upon a container, may be attained by various means and set forth in a number of embodiments. By way of example, the drip catcher may be provided with a sliding or rolling device such as a rod or an arm which is connected with the drip catcher and which swings it to the side due to its sliding or rolling movement upon the edge of the cup when the strainer is placed upon the cup so that the liquid poured into the strainer will reach the cup.

According to another preferred embodiment, the casing carrying the strainer has a member which is movable in the vertical direction and which causes the sidewise swinging of the drip catcher through a leverage system as soon as the casing is placed upon a tea cup.

According to another embodiment of the present invention the sidewise swinging of the drip catcher can be carried out or actuated by hand for example by actuating a preferably resilient slide or by slightly pressing the strainer or the casing connected therewith against the edge of the tea cup, particularly when the drip catcher is comparatively heavy or is difficult to move and when the weight of the strainer and of the support connected therewith is not sufficient to swing the drip catcher to the side.

The important feature in each case is that the return movement of the drip catcher, under the strainer, is not dependent any more upon the will of the user but is carried out automatically as soon as the strainer is raised from the container upon which it is placed.

To reduce to a minimum the path of movement of the drip catcher and the time necessary for its swinging back and forth, the outflow of the strainer is preferably diminished so as to constitute a small nozzle opening slit or the like so that a drip catcher can be used which is only somewhat larger in size than the dimensions of the opening slot or the like. This arrangement has further the advantage that the device can be used for cups of small size which can not be used properly with a drip catcher the size of which corresponds to the diameter of the strainer. This advantage can be secured without diminishing the operative surface of the strainer through the provision of a casing located at a distance from the strainer so as not to interfere with the flow of the liquid and enclosing the strainer either totally or at its lower portion; this casing is then provided with an opening or slot or a nozzle acting as a hopper or the like for the out-flow of the liquid. If the strainer has the form of a half-sphere, the casing can have the same form. On the other hand, in the case of a strainer wherein only the bottom consists of a flat or somewhat curved sieve the casing provided with a central opening or the like can be connected with the strainer by screws or a resilient ring.

The invention will appear more clearly from the following detailed description when taken in connection with the accompanying drawing showing by way of example preferred embodiments of the inventive idea.

In the drawing:

Fig. 1 is a section through a combined strainer and drip catcher with the drip catcher being located under the strainer;

Fig. 2 is a transverse section along the line 2—2 of Fig. 1;

Fig. 3 is a perspective view showing the strainer mounted upon a tea cup;

Fig. 4 is a side view illustrating a somewhat differently constructed strainer and drip catcher;

Fig. 5 shows the device of Fig. 4 in its position upon a tea cup.

The device shown in Figs. 1 to 3 of the drawings includes a semi-spherical strainer 1 which is enclosed by a casing 3. The casing 3 is provided with a handle 2 and has an out-flow nozzle or slit 4.

A drip catcher 5 is located under the nozzle 4 and is somewhat longer and wider than the nozzle 4. Preferably the upper edge of the drip catcher 5 is somewhat flanged or bent inwardly. The drip catcher 5 is suspended from the casing 3 by two arms 5a which are swingably mounted upon opposite sides of the casing.

A cylindrical rod 6 is firmly connected with the bottom of the drip catcher 5 and extends beyond the drip catcher. Supports 7 are mounted upon opposite ends of the rod 6 and serve as supports for the strainer when it is placed upon a flat surface such as a table.

The rod 6 can consist of telescoping portions so that the length of the rod 6 can be conveniently adapted to the size of the tea cup, glass or the like.

The casing 3 is further provided with a support 8, a portion of which is bent to constitute a stop or abutment 9.

In operation the combined strainer and drip catcher is raised by the handle 2 from its position of rest shown in Figs. 1 and 2 and is placed upon a tea cup or other suitable container 10 in the manner shown in Fig. 3. While the strainer is being placed upon the tea cup the rod 6 slides along the edge 11 of the tea cup 10 and thereby swings the drip catcher 5 to the side. The support 8 constitutes a further supporting element for the strainer.

In order to facilitate the beginning of the sliding movement of the rod 6 upon the cup edge 11 it is advantageous not to place the rod 6 directly under the center of gravity of the entire device in its position of rest shown in Fig. 1. This can be attained for example by a corresponding adjustment of the support 9 connected with the casing 3 and serving as a supporting element for the strainer 1.

After use the user raises the strainer by its handle off the cup 10 and then the drip catcher 5 drops immediately by its own force of gravity and due to the gravity of the members 6 and 7 connected therewith to its lowermost position shown in Figs. 1 and 2. In this position the drip catcher 5 engages the stop or abutment 9 so that further swinging of the drip catcher is avoided. It is apparent that it is impossible to move the strainer out of the area enclosed by the cup edge 11 before the drip catcher 5 is placed under the strainer. The stop or abutment 9 secures at the same time the horizontal position of the strainer 1 by acting against the torque produced by the weight of the handle 2 and the support 8 after the device has been placed upon a supporting surface.

Figs. 4 and 5 show a somewhat different construction wherein a flat strainer 20 is removably mounted within the cup-shaped casing 21. The strainer 20 snaps in and out of the casing 21 by suitable means which are not illustrated in detail. The drip catcher 22 has the form of an elongated trough and is swingably supported upon two arms 23 which are pivoted at 24 to the casing 21 on opposite sides thereof.

A U-shaped frame 25 is swingably or otherwise connected with a casing 21. The two downwardly extending legs of the frame 25 are provided with vertical slits 26.

The arms 23 are pivotally connected intermediate their ends with links 27 which are attached to a transverse bar 28. The bar 28 has ends located in the slits 26 and are movable up and down therein.

The casing 21 has a slot 29 through which the liquid flows into the cup when the device is in use and through which the drippings will be guided into the drip catcher or drip pan 22.

It is thus apparent that the movements of the cross bar 27 are limited in three directions, namely up and down and sidewise.

The casing 21 is provided with a handle 30 having the lower end which, along with the lower ends of the U-shaped frame member 25, serves as a support for the device when it is not in use.

In operation the device is placed upon the rim of the cup with the downwardly extending legs of the frame 25 extending outside of the cup on opposite sides thereof while the horizontal portion 31 of the handle 30 serves as a further support for the device. The bar 27 will engage the edge of the cup and due to the weight of the strainer will move upwardly. Then the links 27 and the arms 23 will swing outwardly and will move the drip pan 22 to the side thereby allowing the liquid to flow into the cup through the strainer 20 and the opening 29. It is thus apparent that the strainer operates fully automatically. When the device is lifted from the cup the weight of the drip catcher 22 and of the leverage connected therewith causes the drip catcher to move directly under the opening 29 so that any soiling of the tablecloth is effectively avoided.

It is apparent that the embodiments hereinabove disclosed can vary within wide limits so, for example, the slit-like nozzle 4 can be replaced by round or oval openings and the downwardly extending nozzle 4 shown in Fig. 1 can be replaced by a mere opening or slot cut in the casing 3 or in a plate covering the bottom of the strainer 1. Furthermore the drip catcher 5 need not be of rectangular form as shown but may be round or oval. In general it is advisable to shape the drip catcher so as to conform it to the shape of the outflow of the strainer.

The support 7 shown in Fig. 1 to Fig. 3 may have any other suitable form. By way of example they can have the form of rings enclosing a drip catcher of correspondingly small size so that such a ring can be conveniently swung within a tea cup along with a drip catcher. In that case the ring has an opening arranged so as not to interfere with the engagement of the drip catcher with the stop. It is also possible to arrange the support or the stop, which performs its functions, at a larger distance from the outflow opening of the strainer casing so that the position of the drip catcher dropping the outflow opening, due to the force of gravity, will then be determined by the engagement of the ring with the support. In order to facilitate the sliding or rolling of the rod 6 upon the cup edge, it is possible to provide rotary sleeves upon the rod 6 open at opposite sides of the drip catcher.

As far as the construction shown in Figs. 4 and 5 is concerned, the leverage can be different from that described and illustrated. By way of example, the bar can be guided in slotted plates whereby only the outward swinging of the drip catcher is provided by the relative movement of the strainer to a member movably connected therewith and mounted upon the cup and whereby the return movement of the drip catcher under the strainer is produced by a reversal of the initial movement.

The described device, either totally or in part, can be made of metal or of various plastic materials. The connection between the strainer and the casing can be a removable one through the use of springs or a bayonet lock so that the strainer can be used by itself in the usual manner. The cleaning of the device can be greatly facilitated by such arrangement. Furthermore, the illustrated forms of the strainer can be replaced by one having the form of a trough with an inserted, preferably removable, sieve which would thus facilitate the outflow of the liquid through an opening of diminished size. All such and other variations and modifications are to be included within the scope of the present invention.

What is claimed is:

1. A straining device for a container, said device comprising a strainer, a drip catcher, swingable means connecting said strainer with said drip catcher and selectively swinging said drip catcher from an operative position under the strainer to an inoperative position alongside said strainer, and means connected with the first mentioned means and selectively engaging said container and holding said drip catcher in said inoperative position when said strainer is placed upon the container, said drip catcher swingably moving by gravity to said operative position when said strainer is raised from the container.

2. A straining device for a container, said device comprising a strainer, a drip cacther, a leverage swingably connecting said drip catcher with said strainer for selectively swinging said drip catcher from an operative position under the strainer to an inoperative position alongside said strainer, and a member connected with said drip catcher and gravitationally engaging the container and holding said drip catcher in said inoperative position for maintaining said drip catcher in said inoperative position when said strainer is placed upon the container, said drip catcher swingably moving by gravity to said operative position and when said strainer is raised from the container.

3. A straining device for a container, said device comprising a strainer, a casing enclosing at least the lower portion of said strainer and spaced therefrom, said casing having formed therein a substantially small opening for the outflow of the liquid passing through the strainer, a drip catcher, swingable means connecting said strainer with said drip catcher and swinging said drip catcher from an operative position under said opening to an inoperative position, and means connected with the first mentioned means and engaging said container in said inoperative position when said strainer is placed upon the container, said drip catcher moving by gravity to said operative position when said strainer is raised from the container.

4. A straining device for a container, said device comprising a strainer, a drip catcher, swingable means connecting said strainer with said drip catcher and selectively swinging said drip catcher from an operative position under the strainer to an inoperative position alongside said strainer, means connected with the first-mentioned means and engaging said container and holding said drip catcher in said inoperative position when said strainer is placed upon the container, said drip catcher swingably moving by gravity to said operative position when said strainer is raised from the container, and a stop connected with said strainer and engaging said drip catcher in said operative position.

5. A straining device for a container, said device comprising a strainer, a drip catcher, a leverage swingably connecting said drip catcher with said strainer for selectively swinging said drip catcher from an operative position under the strainer to an inoperative position alongside said strainer, a vertically reciprocable member connected with said leverage and gravitationally engaging said container in said inoperative position for maintaining said drip catcher in said inoperative position when said strainer is placed upon the container, means connected with said strainer for guiding said member in the course of its vertical reciprocatory movement, and means connected with said strainer for supporting said strainer upon said container, said drip catcher swingably moving by gravity from alongside said strainer to said operative position when said strainer is raised from the container.

6. A straining device for a container, said device comprising a strainer, a drip catcher, rods swingably suspended from said strainer and carrying said drip catcher for swinging said drip catcher from an operative position under the strainer to an inoperative position, levers having ends pivotally connected with said rods intermediate the ends of the rods, a transverse bar connected with other ends of said levers, a frame member connected with said strainer and having vertical slots formed therein, said bar having ends located in said slots, whereby said bar is reciprocable in said frame member and whereby said drip catcher is swung to said inoperative position when said bar engages the container while the strainer is being placed upon the container, and means connected with said strainer for supporting said strainer upon said container, said drip catcher moving by gravity to said operative position when said strainer is raised from the container.

7. A straining device for a container, said device comprising a strainer, a drip catcher, rods swingably suspended from said strainer and carrying said drip catcher for swinging said drip catcher from an operative position under the strainer to an inoperative position, levers having ends pivotally connected with said rods intermediate the ends of the rods, a transverse bar connected with other ends of said levers, a frame member connected with said strainer and having vertical slots formed therein, said bar having ends located in said slots whereby said bar is reciprocable in said frame member and whereby said drip catcher is swung to said inoperative position while selective release of said leverage said drip catcher is disengaged from its inoperative position swingably gravitationally to said operative position underneath said strainer when said strainer is removed from the container.

References Cited in the file of this patent

UNITED STATES PATENTS

| | | |
|---|---|---|
| 859,105 | Porter | July 2, 1907 |
| 930,938 | Clement | Aug. 10, 1909 |
| 950,888 | Barstow | Mar. 1, 1910 |
| 956,493 | Johnson | Apr. 26, 1910 |
| 1,094,098 | Rakottyay | Apr. 21, 1914 |
| 1,153,090 | McCarthy | Sept. 7, 1915 |
| 1,478,628 | Apotheloz | Dec. 25, 1923 |

FOREIGN PATENTS

| | | |
|---|---|---|
| 354,811 | France | Oct. 17, 1905 |
| 575,604 | France | Aug. 2, 1924 |